(12) United States Patent
Collins et al.

(10) Patent No.: US 11,018,799 B1
(45) Date of Patent: May 25, 2021

(54) ADAPTING THE PERFORMANCE OF THE DECISION FEEDBACK DEMODULATOR BASED ON QUANTIFIED IMPAIRMENTS

(71) Applicant: QUALCOMM Incorporated, San Diego, CA (US)

(72) Inventors: Matthew Collins, Bradford on Avon (GB); Ondrej Jakubov, Bristol (GB); Steven Meade, Bristol (GB)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 16/937,395

(22) Filed: Jul. 23, 2020

(51) Int. Cl.
| | |
|---|---|
| *H04L 27/14* | (2006.01) |
| *H04L 27/22* | (2006.01) |
| *H04L 1/00* | (2006.01) |
| *H04L 5/00* | (2006.01) |
| *H04W 4/80* | (2018.01) |
| *H04L 27/26* | (2006.01) |
| *H04L 27/20* | (2006.01) |

(52) U.S. Cl.
CPC .......... *H04L 1/0003* (2013.01); *H04L 5/0023* (2013.01); *H04L 27/2082* (2013.01); *H04L 27/2613* (2013.01); *H04L 27/2647* (2013.01); *H04W 4/80* (2018.02)

(58) Field of Classification Search
CPC . H04L 1/0003; H04L 5/0023; H04L 27/2613; H04L 27/2647; H04W 4/80
See application file for complete search history.

(56) References Cited

U.S. PATENT DOCUMENTS

| | | | |
|---|---|---|---|
| 9,628,309 B1* | 4/2017 | Luong | H04L 25/03057 |
| 2014/0072307 A1* | 3/2014 | Zamani | H04L 25/025 |
| | | | 398/79 |
| 2019/0173606 A1* | 6/2019 | Jakubov | H04L 1/0025 |

* cited by examiner

*Primary Examiner* — David S Huang
(74) *Attorney, Agent, or Firm* — Muncy, Geissler, Olds & Lowe, P.C.

(57) ABSTRACT

Disclosed are techniques for wireless communication. In an aspect, a receiver wireless device receives, from a transmitter wireless device, a wireless signal comprising a plurality of modulated symbols forming at least one packet, determines a quantification of impairments associated with the plurality of modulated symbols of the wireless signal, the impairments caused by the receiver wireless device, the transmitter wireless device, or both, determines a remembrance factor based on the quantification of the impairments, and demodulates the plurality of modulated symbols of the wireless signal based on a number of previously demodulated symbols, wherein the number of previously demodulated symbols is based on the remembrance factor.

34 Claims, 8 Drawing Sheets

Fixed Remembrance Factor

Adapt Remembrance Factor within a long packet

Adapt Remembrance Factor over multiple packets

Adaptation within Packet - Modulation Index is Not Stable

ADAPTING THE PERFORMANCE OF THE DECISION FEEDBACK DEMODULATOR BASED ON QUANTIFIED IMPAIRMENTS

FIELD OF DISCLOSURE

Aspects of this disclosure relate generally to wireless communications, and more particularly, to demodulation for Bluetooth® wireless communication.

BACKGROUND

Bluetooth® is a type of wireless technology usually used for exchanging data between devices over short distances, for example, a personal area network (PAN). Although initial Bluetooth® applications were used for communicating audio data (e.g., a wireless headset) or pointing device movement/selection data (e.g., a wireless mouse), recent Bluetooth® applications are utilized for communicating entire data files and other discrete data that requires error-free transmission so as to avoid data corruption.

A decision feed-back demodulator (DFD) can be used to demodulate linear or non-linear single carrier digital modulations, with or without inter-symbol interference (ISI). Examples include Bluetooth® modulations such as gaussian frequency-shift keying (GFSK), and phase-shift keying (PSK) variants. The DFD features a feedback that weights the contribution of historical information to aid the reconstructed signal reference. In an environment with no transmit and receive impairments, a highly weighted history improves the performance, which in turn, asymptotically achieves the performance of a coherent receiver. The factor that weights the history is named the remembrance factor, and has a value of '1' for maximum history and '0' for no history.

However, in the presence of transmit or receive impairments, such as frequency drift, modulation index mismatch, frequency offset, or timing drift, the DFD's optimal performance is achieved for lower than the maximum remembrance factor. Despite the fact that transmitters and receivers are allowed to have large impairments, many of them highly outperform these requirements. A traditionally designed DFD would set a compromising remembrance factor to interoperate between clean and dirty impairments. This would result in compromised sensitivity (range) for the clean case, and compromised immunity to impairments and possibly interference for the dirty case.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a receiver wireless device includes receiving, from a transmitter wireless device, a wireless signal comprising a plurality of modulated symbols forming at least one packet, determining a quantification of impairments associated with the plurality of modulated symbols of the wireless signal, the impairments caused by the receiver wireless device, the transmitter wireless device, or both, determining a remembrance factor based on the quantification of the impairments, and demodulating the plurality of modulated symbols of the wireless signal based on a number of previously demodulated symbols, wherein the number of previously demodulated symbols is based on the remembrance factor.

In an aspect, a receiver wireless device includes a memory, a wireless interface, and at least one processor communicatively coupled to the memory and the wireless interface, the at least one processor configured to: receive, from a transmitter wireless device via the wireless interface, a wireless signal comprising a plurality of modulated symbols forming at least one packet, determine a quantification of impairments associated with the plurality of modulated symbols of the wireless signal, the impairments caused by the receiver wireless device, the transmitter wireless device, or both, determine a remembrance factor based on the quantification of the impairments, and demodulate the plurality of modulated symbols of the wireless signal based on a number of previously demodulated symbols, wherein the number of previously demodulated symbols is based on the remembrance factor.

In an aspect, a receiver wireless device includes means for receiving, from a transmitter wireless device, a wireless signal comprising a plurality of modulated symbols forming at least one packet, means for determining a quantification of impairments associated with the plurality of modulated symbols of the wireless signal, the impairments caused by the receiver wireless device, the transmitter wireless device, or both, means for determining a remembrance factor based on the quantification of the impairments, and means for demodulating the plurality of modulated symbols of the wireless signal based on a number of previously demodulated symbols, wherein the number of previously demodulated symbols is based on the remembrance factor.

In an aspect, a non-transitory computer-readable medium storing computer-executable instructions includes computer-executable instructions comprising: at least one instruction instructing a receiver wireless device to receive, from a transmitter wireless device, a wireless signal comprising a plurality of modulated symbols forming at least one packet, at least one instruction instructing the receiver wireless device to determine a quantification of impairments associated with the plurality of modulated symbols of the wireless signal, the impairments caused by the receiver wireless device, the transmitter wireless device, or both, at least one instruction instructing the receiver wireless device to determine a remembrance factor based on the quantification of the impairments, and at least one instruction instructing the receiver wireless device to demodulate the plurality of modulated symbols of the wireless signal based on a number of previously demodulated symbols, wherein the number of previously demodulated symbols is based on the remembrance factor.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
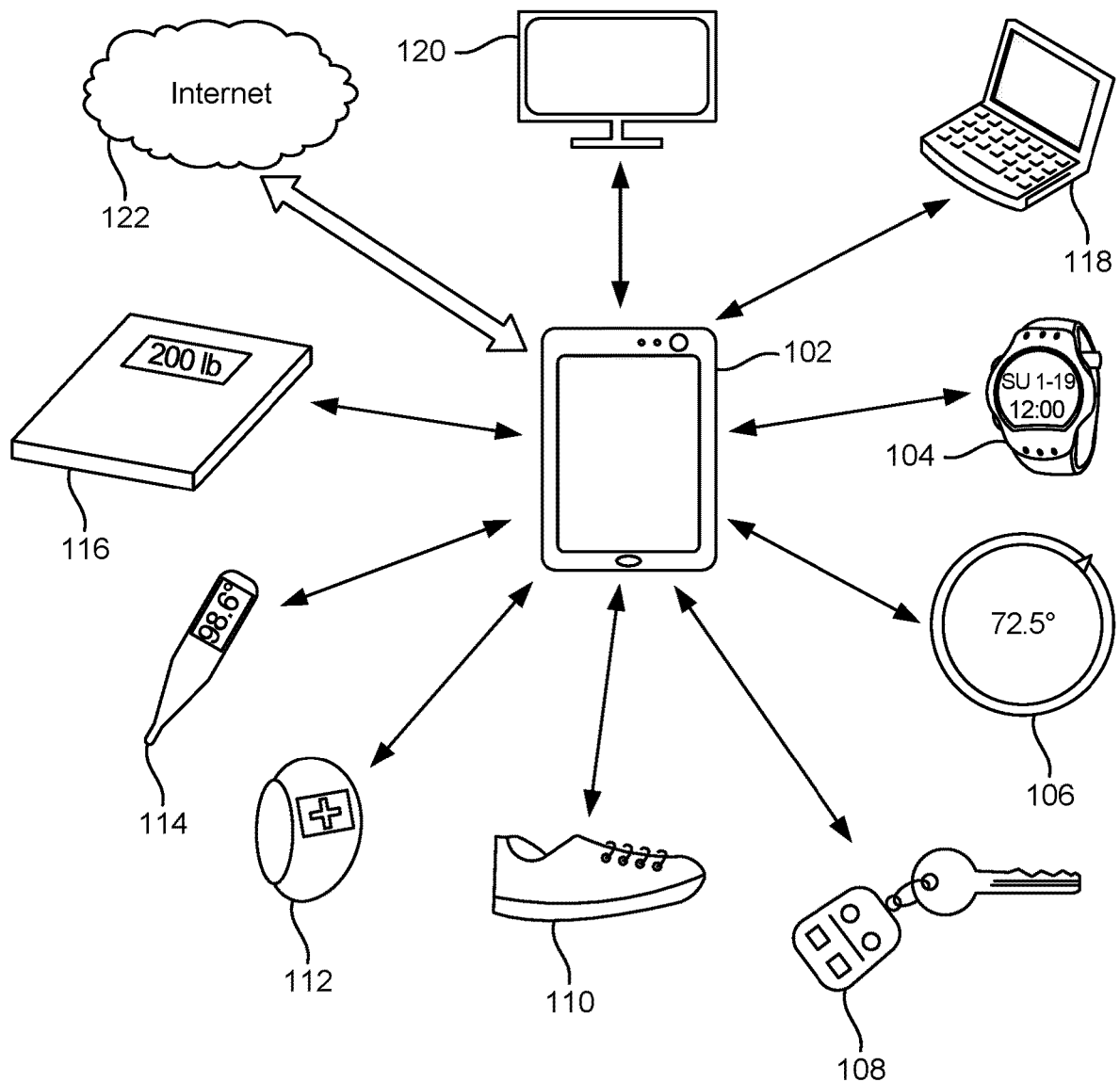
FIG. 1 illustrates various consumer devices in which aspects of the disclosure may be incorporated.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "wireless device" refers to any type of device that includes Bluetooth® capability, whether Bluetooth® Classic, Bluetooth® Smart, Bluetooth® Smart Ready, or other. In general, a wireless device may be any wireless communication device, such as a mobile phone, router, tablet computer, laptop computer, tracking device, wearable (e.g., smartwatch, wireless headset, earbuds, glasses, augmented reality (AR)/virtual reality (VR) headset, etc.), in-vehicle communication device, portable hard drive, computer gaming device, pointing device (e.g., a mouse, keyboard, pen, trackball, joystick, etc.), Internet of Things (IoT) device (e.g., home appliance, television, smart speaker, etc.), etc., capable of communicating with other wireless devices over a Bluetooth® link. In addition to being Bluetooth® capable, a wireless device may be able to communicate over other types of wireless networks, such as a wireless local area network (WLAN) (e.g., based on IEEE 802.11, etc.) or a cellular network (e.g., Long-Term Evolution (LTE), 5G New Radio, etc.), to name a few examples. Such a wireless device may be referred to interchangeably as a "user equipment" (UE), an "access terminal" (AT), a "client device," a "subscriber device," a "subscriber terminal," a "subscriber station," a "user terminal" (UT), a "mobile device," a "mobile terminal," a "mobile station," or variations thereof.

A wireless device may be configured as a controller or remote (or "peripheral"). Often the controller is a smartphone, tablet, or personal computer. A controller may set up a wireless network with multiple remotes, where connections are established between the controller and each remote. A wireless device may also be configured as a server or a client. In practice, the server may be thought of as having data of interest, whereas a client connects with the server to request the data and perhaps modify the state of the server. Usually, the controller is the client and a remote is the server.

For example, a Bluetooth® home thermostat may store temperature values over some period of time and perform as a server and remote to a smartphone when the smartphone is brought in proximity to the home thermostat. The home thermostat may advertise itself so that when the smartphone is in range a connection is established with the smartphone as the controller and the home thermostat as the remote. In this example, the smartphone performs as the client, requesting the stored temperature values from the home thermostat. Based upon an application running on the smartphone, the smartphone may change the state of the thermostat whereby the home thermostat's temperature setting is raised or lowered depending upon the stored temperature readings and other information that the smartphone may access from the home thermostat or perhaps from cloud-based databases.

Bluetooth® technology has found applications in many devices in common use around the home, office, factory, etc. For example, FIG. 1 illustrates a wireless network in which a smartphone 102 may be a controller and client to multiple Bluetooth® capable devices: a wristwatch 104 with a sensor to measure pulse rate; a home thermostat 106; a key fob 108 with stored car seat settings and other car preferences; an athletic shoe 110 with a pedometer; a wrist band 112 with a sensor to measure blood pressure and heart rate; a personal thermometer 114; a weight scale 116; a laptop 118; and a television 120. The smartphone 102 may be connected to the Internet 122 so that various databases may be accessed to store readings or to adjust the state of some of the Bluetooth® devices, or perhaps to alert a health care professional or emergency service personnel if a reading from a Bluetooth® device indicates a health issue or urgent situation.

Figure 2:
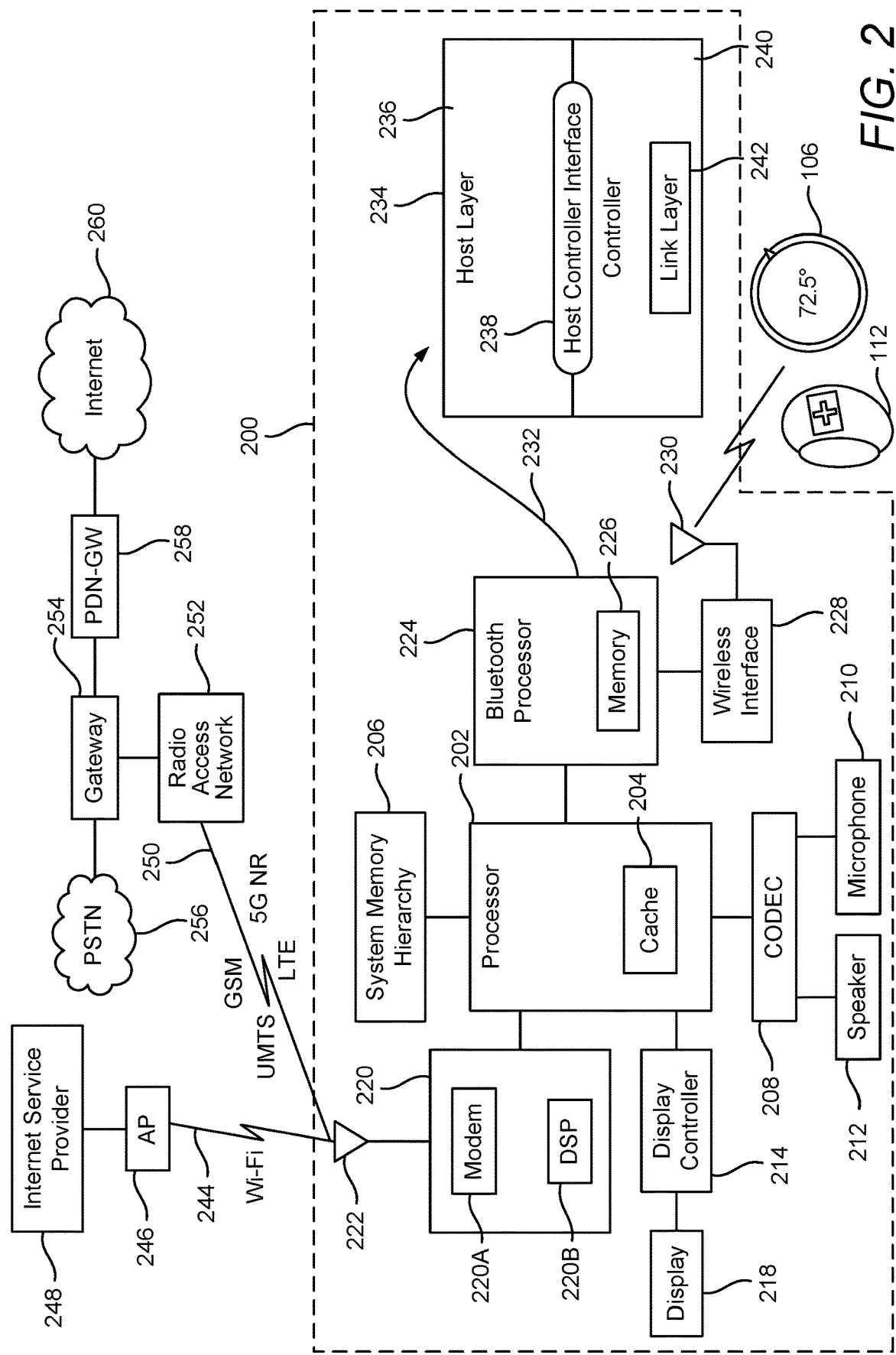
FIG. 2 illustrates a simplified diagram of an exemplary architecture of a device capable of implementing the techniques described herein.

FIG. 2 illustrates a wireless device 200 in which aspects of the disclosure may find application. The wireless device 200 may be any one of a number of communication devices, such as a smartphone, tablet, or laptop, to name a few examples. The wireless device 200 may be a controller wireless device or a peripheral wireless device, or may at times operate as a controller wireless device or a peripheral wireless device. The main processor 202 for the wireless device runs applications visible to the user of the wireless device and includes a cache memory 204 as well as an interface to store and retrieve data and instructions from off-chip memory, represented in FIG. 2 as the system memory hierarchy 206. The system memory hierarchy 206 may comprise various volatile and non-volatile memory systems. Also shown in FIG. 2 is the CODEC (coder-decoder) 208 for interfacing with the microphone 210 and the speaker 212. The display controller 214 provides an interface to the display 218 so that the user may easily interact with the wireless device.

The wireless device 200 is capable of interfacing with other wireless networks by way of a transceiver 220, also referred to as a wireless interface, and one or more antennas 222. The transceiver 220 is illustrated as comprising a modem 220A and a digital signal processor (DSP) 220B, although in practice other kinds of modules may be employed, all or some such modules may be integrated on a single chip, and some of the modules may be integrated with the processor 202.

The main processor 202 may implement a Bluetooth® Classic, Bluetooth® Smart, and/or Bluetooth® Smart Ready protocol stack in which instructions for performing some or all of the protocol stack are stored in the system memory hierarchy 206. However, in the example of FIG. 2, a separate chip or an embedded hardware core, shown as a Bluetooth® processor 224, implements the portions of the protocol stack to perform the Bluetooth® functionality described herein. The Bluetooth® processor 224 comprises a memory 226, shown as an on-chip memory, although the memory 226 may be part of a memory hierarchy in which some memory also resides off-chip. A wireless interface 228 provides an interface to one or more antennas 230, suitable for operating in the designated frequency spectrum utilized by Bluetooth®. Communication may be made any number of Bluetooth®-capable devices, such as for example the home thermostat 106 or the wristband 112, to name just two examples.

The arrow 232 serves to indicate that the Bluetooth® processor 224 performs the protocol stack, represented by the box labeled 234. Shown in the protocol stack 234 are the host layer 236, the host controller interface 238, and the controller 240. The controller 240 includes the link layer 242. For ease of illustration, not all layers are shown. Software or firmware running on the Bluetooth® processor 224 may implement all or some of the layers in the protocol stack 234, and special purpose hardware, such as an ASIC, may also implement some of the layers.

It is to be appreciated that the Bluetooth® processor 224 may represent more than one processor, where for example a programmable processor may implement the host layer 236 and a DSP may implement some or all of the actions performed by controller 240, except perhaps for the physical layer (not shown). The instructions for implementing some or all of the Bluetooth® functionality described herein may be stored in a memory, such as for example the memory 226. The memory 226 may be referred to as a non-transitory computer readable medium.

The wireless device 200 can participate in one or more wireless networks to gain access to the Internet. In the example of FIG. 2, the wireless device 200 has a Wi-Fi link 244 to an access point (AP) 246, where an Internet service provider (ISP) 248 provides access to the Internet.

The wireless device 200 may also have the functionality of a cellular phone so as to participate in any one of a number of cellular networks. For example, the wireless device 200 may have an air interface link 250 that may, for example, be compatible with various cellular networks, such as Global System for Mobile communications (GSM), Universal Mobile Telecommunications Systems (UMTS), Long-Term Evolution (LTE), 5G New Radio (NR), and the like. The air interface link 250 provides communication to a radio access network 252, where the architecture of the radio access network 252 depends upon the type of cellular network standard. For example, in the case of GSM, the radio access network 252 may include a base station, for UMTS it may include a Node-B, for LTE it may include an eNode-B, and for 5G NR it may include a gNode-B, as specified by 3GPP (3rd Generation Partnership Project).

Not all functional units are illustrated in FIG. 2 for providing a connection to the Internet, but for ease of illustration several components are shown, such as the gateway 254 that generically represents several network components for providing communication to the public switched telephone network (PSTN) 256 and the packet data network gateway (PDN-GW) 258, where the PDN-GW 258 provides the proper communication interface to the Internet 260. As is apparent, the network architecture illustrated in FIG. 2 for the Wi-Fi link 244 and the air interface link 250 is simplified for ease of illustration.

As described above, a decision feed-back demodulator (DFD) can be used to demodulate linear or non-linear single-carrier digital modulations, with or without inter-symbol interference (ISI). Bluetooth® uses different types of modulation, gaussian frequency-shift keying (GFSK), phase-shift keying (PSK), and variations of PSK, such as it/4-differential quadrature PSK (DQPSK) and 8-DPSK, depending on the application.

Frequency modulation is the encoding of information onto a carrier wave by varying the instantaneous frequency of the wave. For example, a binary one is represented by a positive frequency deviation and a binary zero is represented by a negative frequency deviation. For GFSK modulation, the modulated signal is then filtered using a filter with a Gaussian response curve to ensure that the sidebands do not extend too far to either side of the main carrier. GFSK modulation achieves the channel bandwidth with stringent filter requirements to prevent interference on other channels. However, it does come at the cost of increasing ISI.

PSK is a modulation process that conveys data by changing (modulating) the phase of a constant frequency reference signal (the carrier wave). PSK uses a finite number of phases (e.g., 2, 4, 8), each assigned a unique pattern of binary digits. Usually, each phase encodes an equal number of bits. Each pattern of bits forms the symbol that is represented by the particular phase. Thus, for example, the four phases of a quadrature PSK (QPSK) represent the binary digit patterns "00," "01," "10," and "11," and these patterns represent four different symbols. The demodulator, which is designed specifically for the symbol-set used by the modulator, determines the phase of the received signal and maps it back to the symbol it represents, thus recovering the original data. A plurality of symbols at the physical/link layer convey a data packet, with header and payload, at higher layers. QPSK modulation enables higher data rates than GFSK.

PSK may be either coherent or non-coherent. In coherent PSK (CPSK), the receiver (referred to as a "coherent" receiver) compares the phase of the received signal to a reference signal to determine the phase of the received signal. However, this requires the demodulator to extract the reference waveform from the received signal. In non-coherent PSK, referred to as differential PSK (DPSK), the receiver (referred to as a "differential" receiver) can measure the phase shift of each received symbol with respect to the phase of the previous symbol to determine which symbol the current symbol is. However, while simpler to implement than CPSK, it is more error prone.

As noted above, Bluetooth® uses the it/4-DQPSK and 8-DPSK variants of DPSK. With DPSK, a receiver wireless device may not have the ability to exactly determine the phase of a received signal due to impairments to the signal. An "impairment" to a wireless signal can be caused by the transmitter wireless device, the receiver wireless device, and/or environmental conditions. Impairments caused by the transmitter include frequency offset, frequency drift, phase noise, modulation index mismatch (only applicable to GFSK), and timing drift. If the impairments reach a certain threshold, the demodulator is tuned to operate closer to a non-coherent mode. A transmitter that transmits a wireless signal without impairment is referred to as a "clean" transmitter, and a transmitter than transmits a wireless signal with impairments is referred to as a "dirty" transmitter. The terms "clean" and "dirty" are well-defined in the Bluetooth® specifications.

The DFD of a coherent receiver features a feedback that weights the contribution of historical information to aid the reconstructed reference signal. In an environment with no transmit and receive impairments, a highly weighted history improves the performance, which in turn, asymptotically achieves the performance of a coherent receiver. The factor that weights the history is named the "remembrance factor," and has a value of '1' for maximum history and '0' for no history. Specifically, the remembrance factor controls the number of previously demodulated symbols to use in the demodulation process.

However, in the presence of transmit and/or receive impairments, such as frequency drift, modulation index mismatch, frequency offset, and/or timing drift, the DFD's optimal performance is achieved for lower than the maximum remembrance factor. Despite the fact that transmitters are allowed to have large impairments, many of them highly outperform these requirements. For example, many transmitters operate with low phase noise and frequency drift and their modulation index is stable.

In greater detail, the combined transmit and receive frequency offset can be estimated with small error during the receiver's acquisition phase. In most cases, the timing drift is directly related to the frequency, as it is locked to the same frequency source. However, assuming this is not case in general, the contribution of this impairment is very low, and its effect can be tracked without impacting performance. A GFSK modulation index produced by a Cartesian transmitter is typically very close to the nominal value. For a Polar transmitter, the value may be further away, but fixed. The effect of a modulation index mismatch in the DFD and tracking loops is significant. However, if the modulation index is stable, it can be estimated, and the reconstructed waveform can take the estimated modulation index into account. Transmitters with a phase locked loop (PLL) generated frequency reference will have a very small frequency drift. As such, the actual impairments, while permitted to be large, are usually not, and in at least some cases, can be quantified.

Figure 3:
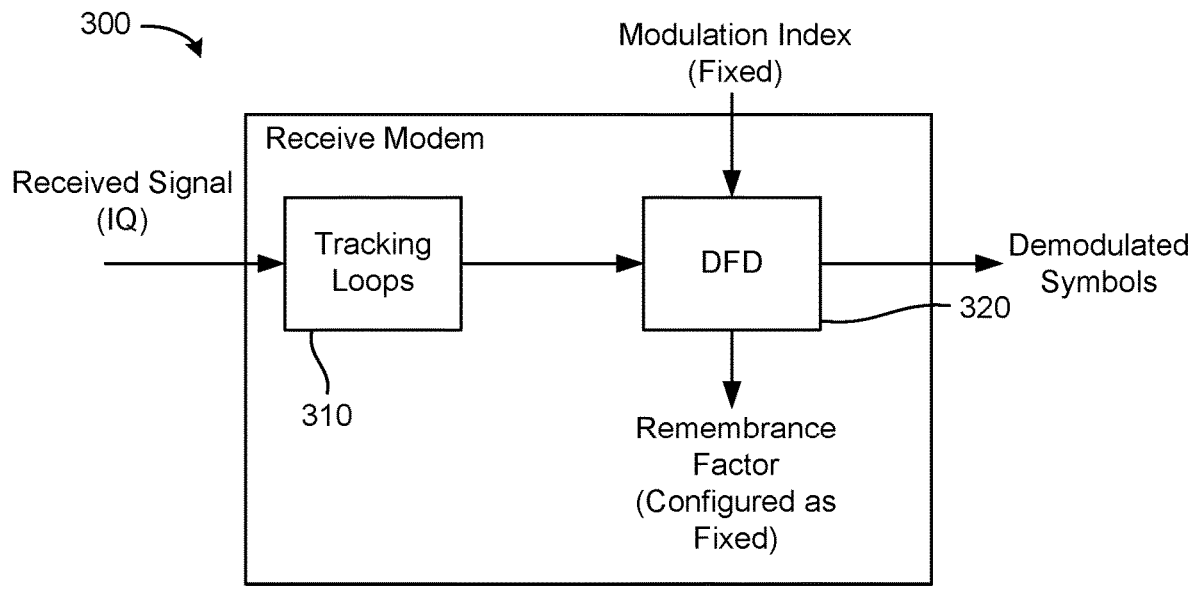
FIG. 3 is a high-level diagram of a conventional receive modem.

FIG. 3 is a high-level diagram of a conventional receive modem 300. A receive modem for Bluetooth® communications, such as receive modem 300, may be part of the Bluetooth® processor 224 or the wireless interface 228. The receive modem 300 includes tracking loops 310 that receive the incoming signal (referred to as the "IQ"). The received wireless signal may be a data stream of a plurality of packets (each packet conveyed by one or more symbols). The reception of the wireless signal by the tracking loops 310 is referred to as the acquisition phase.

In greater detail, the tracking loops 310 sample the stream of IQ samples at a higher rate that the symbol rate (e.g., the symbol rate is 1 MHz for Bluetooth®). The tracking loops 310 decimate the input signal down to the symbol rate and track the ideal decimation time (sometimes referred to as the "on-time" sample). The tracking loops 310 also calculate the frequency offset and feed this back to a complex rotator, which will attempt to remove this frequency offset from future incoming symbols. In addition, for GFSK, the tracking loops 310 estimate the modulation index and feed this to the DFD 320.

The tracking loops 310 output the received signal to the DFD 320, which also takes as input a fixed (or configured as fixed) remembrance factor. In the conventional approach, the receiver's assumed modulation index is typically either fixed or forwarded from a fixed estimate and used throughout the payload. Based on these inputs, the DFD 320 demodulates the input stream and outputs a stream of demodulated symbols.

Because impairments are permitted to be large, a traditionally designed DFD sets a compromising remembrance factor to interoperate between clean and dirty impairments. This would result in compromised sensitivity (range) for the clean case, and compromised immunity to impairments and possibly interference for the dirty case. That is, the design of a conventional DFD uses a static configuration, which compromises performance because it is blind to the actual impairments, and is therefore non-optimal for either the clean case or the dirty case. As would be appreciated, since most transmitters and receivers operate with low and/or predictable impairments (as described above), such a compromising remembrance factor is wasteful in most use cases and a larger range (sensitivity) can be achieved.

Accordingly, the present disclosure presents an adaptive approach that quantifies the impairments and sets the remembrance factor correspondingly to improve sensitivity for the clean case and immunity in the dirty case. In an aspect, impairments can be quantified during a long packet and the remembrance factor can adapt within the packet, or more packets can be collected, and the remembrance factor can be adapted for the given point-to-point link over multiple packets. Note that for Bluetooth® Classic, the payload of the longest packet (3-DH5) is 2723 µs. However, it is not needed to have full length packets to train the modulation index. In general, the described technique should be applicable to commonly used packet lengths for data transfers or streams where sensitivity improvement is important.

Referring to the adaption of the remembrance factor within a packet, the remembrance factor of the DFD demodulator can be adapted during demodulation of a packet. This can yield improvements for long packets, such as audio or data streaming packets.

Figure 4:
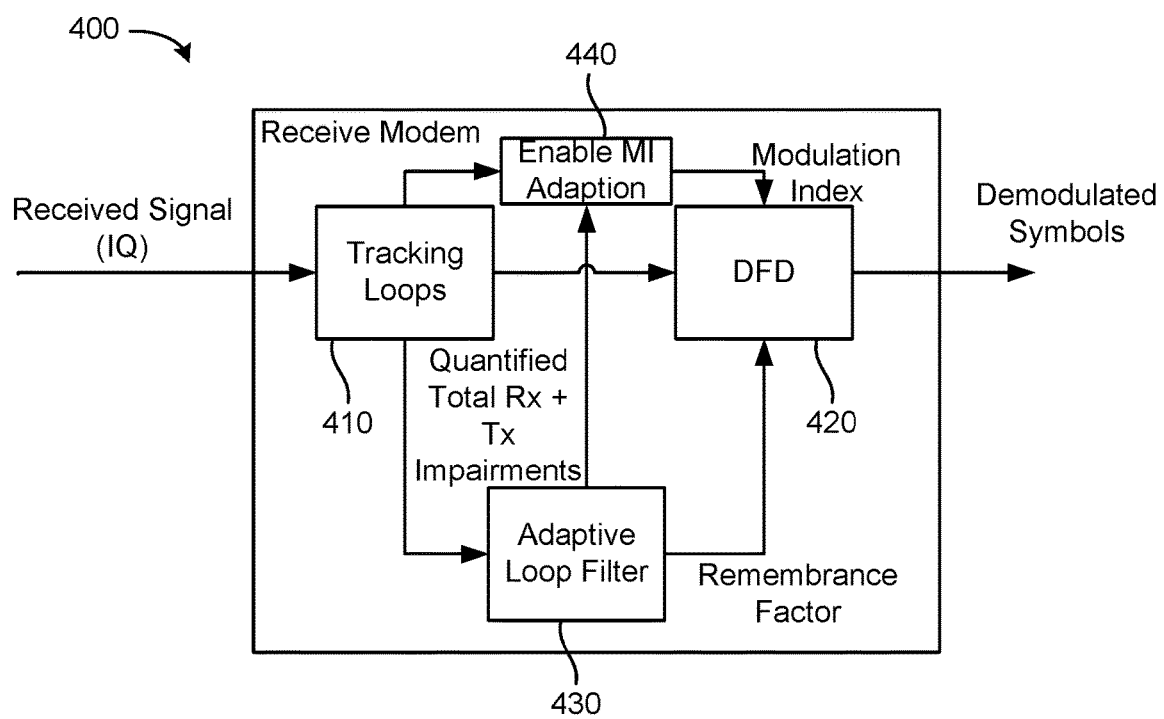
FIG. 4 is a high-level diagram of a receive modem in which the remembrance factor can be adapted within a long packet, according to aspects of the disclosure.

FIG. 4 is a high-level diagram of a receive modem 400 in which the remembrance factor can be adapted within a long packet, according to aspects of the disclosure. The receive modem 400 includes tracking loops 410 that receive the incoming wireless signal (referred to as the "IQ"). The received wireless signal may be a data stream of a plurality of packets. The tracking loops 410 output the signal to the DFD 420. In addition, as described below with reference to FIG. 6, the tracking loops 410 determine the quantified total receiver (Rx) and transmitter (Tx) impairments and output them to an adaptive loop filter 430.

The adaptive loop filter 430 adapts the remembrance factor based on the impairment quantification from the tracking loops 410 and outputs it to the DFD 420. The adaption of the remembrance factor should start as soon as the impairments quantification from the tracking loops 410 is stable and robust. In the meantime, initial (nominal) values can be used.

Similarly, the modulation index should be adapted once deemed stable. Optionally, even if the modulation index is not stable, but has a medium variance concentrated around a mean modulation index, the modulation index can be adapted to the mean. Accordingly, the receive modem 400 further includes an enable modulation index (MI) adaption module 440 that receives the data stream from the tracking loops 410. In addition, the enable MI adaption module 440 receives information from the adaptive loop filter 430, which enables the enable MI adaption module 440 to adapt the modulation index. Based on the information from the adaptive loop filter 430 and the enable MI adaption module 440, the DFD demodulates the data stream received from the tracking loops 410 and outputs a demodulated stream of symbols.

Referring to the adaption of the remembrance factor over multiple packets, the advantage of this method is that it can be extended to either the firmware or an optional dedicated hardware accelerator facilitating processing of the packets (referred to herein as a "packet processor") with small or no modifications to the receive modem (compared to traditional implementations, such as illustrated in FIG. 3).

Figure 5:
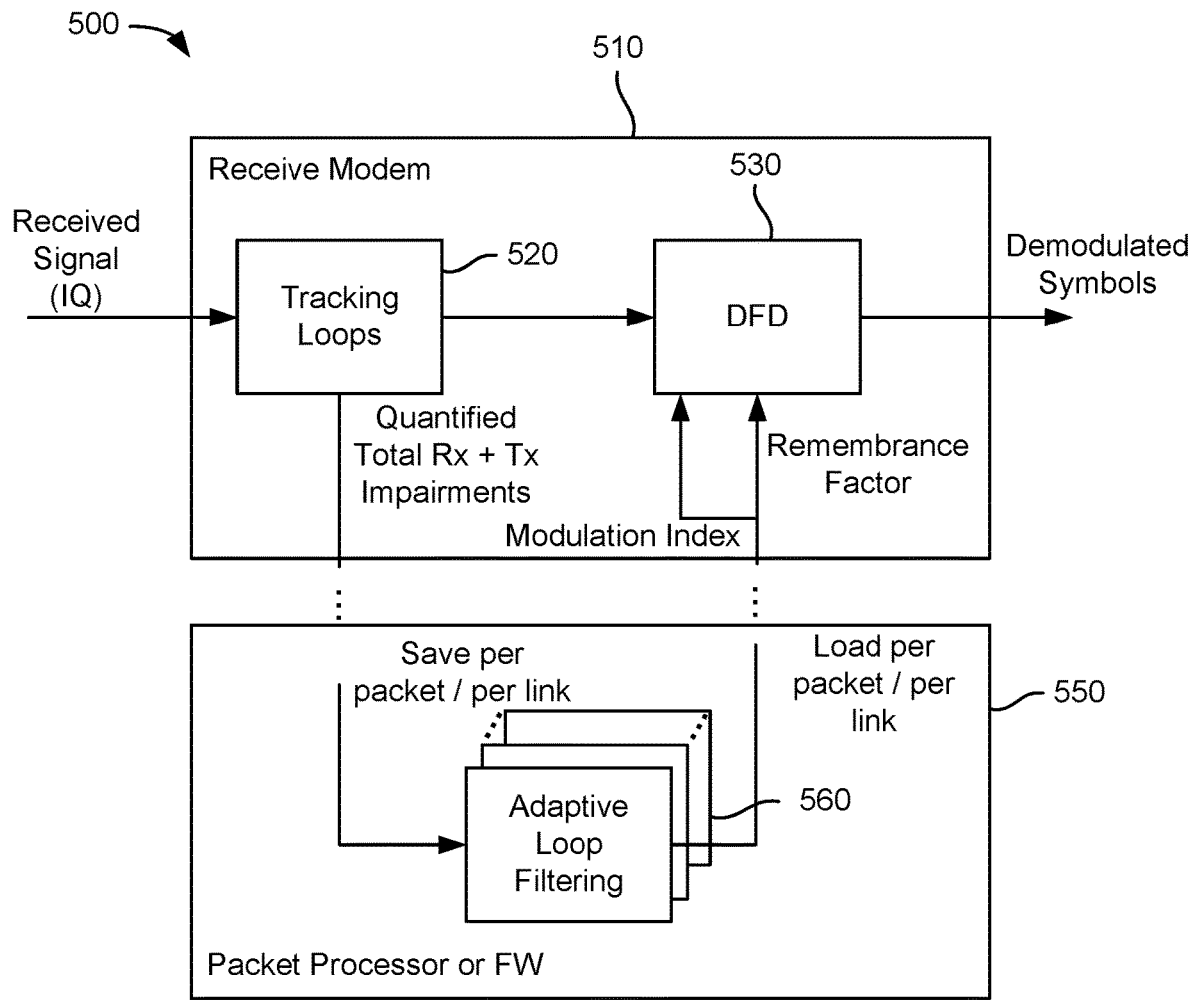
FIG. 5 is a high-level diagram of a receive modem in which the remembrance factor can be adapted over multiple packets, according to aspects of the disclosure.

FIG. 5 is a high-level diagram 500 of a receive modem 510 in which the remembrance factor can be adapted over multiple packets, according to aspects of the disclosure. The receive modem 510 includes tracking loops 520 that receive the incoming wireless signal (referred to as the "IQ"). The received wireless signal may be a data stream of a plurality of packets. The tracking loops 520 output the received signal to the DFD 530.

In the example of FIG. 5, the adaption is performed by either the firmware or the packet processor 550 (via a hardware link and higher layer signaling). Because of this, the measurements and settings of the remembrance factor and other settings need to be associated with a link identifier (ID).

Specifically, the tracking loops 520 determine the quantified total receiver (Rx) and transmitter (Tx) impairments (as described below with reference to FIG. 6) and outputs them to the firmware or packet processor 550. The adaptive loop filtering block 560 saves these inputs per packet and/or per link. The firmware or packet processor 550 outputs the adapted modulation index and remembrance factor to the DFD 530 once every some number of packets, but continues to measure/monitor impairments every packet. The DFD 530 demodulates the data stream based on these inputs and outputs a stream of demodulated symbols.

In an aspect, the solutions illustrated in FIGS. 4 and 5 can be combined. For example, the remembrance factor can be adapted within the first packet of a data flow, and then for subsequent packets of the data flow, the remembrance factor can be adapted across the additional packets.

Figure 6:
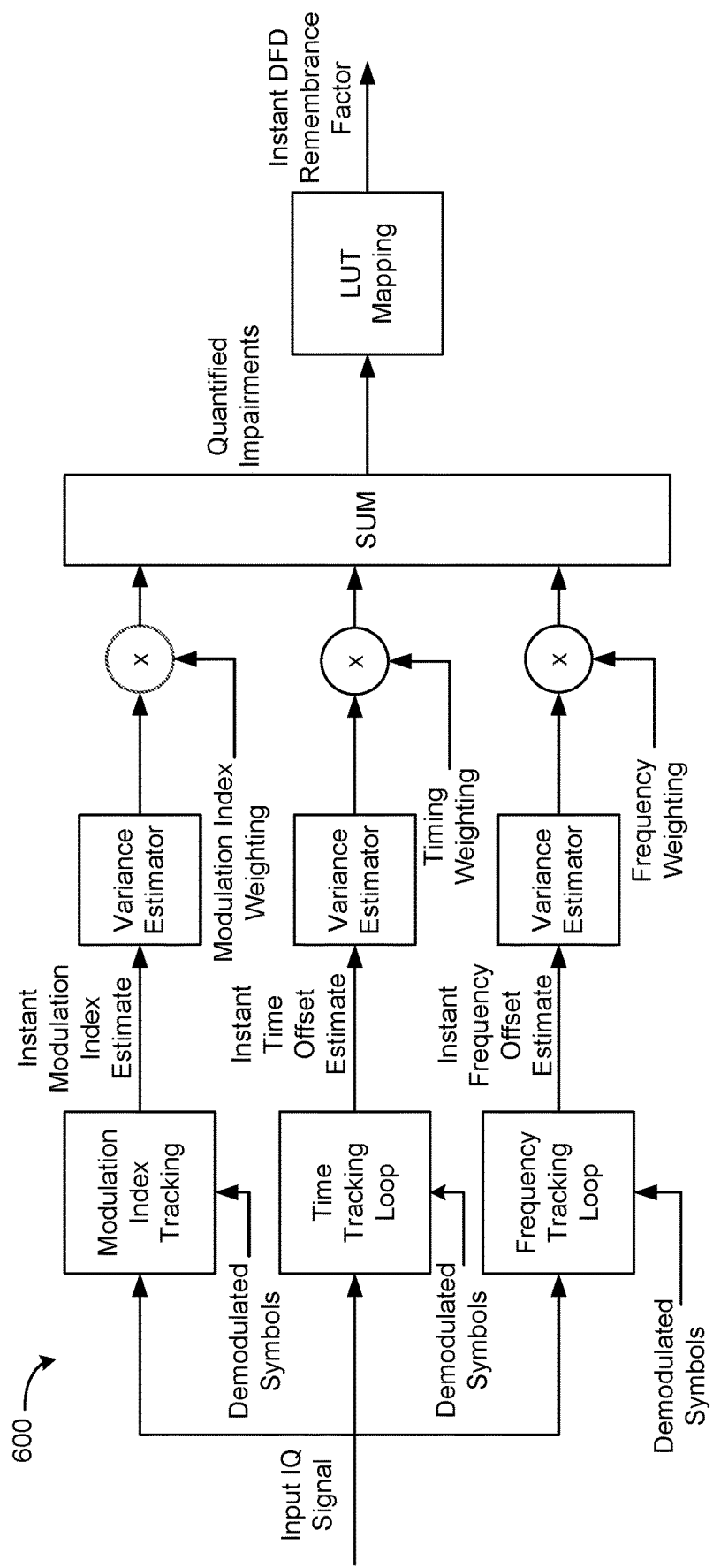
FIG. 6 is a diagram of an example implementation of a remembrance factor adaption block, according to aspects of the disclosure.

FIG. 6 is a diagram of an example implementation of a remembrance factor adaption block 600, according to aspects of the disclosure. The remembrance factor adaption block 600 may be implemented in the tracking loops 410 and 520. The remembrance factor adaption block 600 includes estimation of the variance of the tracking loop outputs and their weighting to obtain the combined quantification of the impairments. A lookup table (LUT) can be implemented to map the quantified impairments to the actual remembrance factor. The remembrance factor adaption block 600 may output the determined remembrance factor to the adaptive loop filter 430 or adaptive loop filtering block 560, which can then provide it to the DFD 420 and the DFD 530, respectively.

The remembrance factor adaption block 600 includes a modulation index tracking loop, a time tracking loop, and a frequency tracking loop, each of which receives the input wireless data stream ("input IQ signal" in FIG. 6) and previously demodulated symbols (thereby forming a feedback loop with the DFD). The previously demodulated symbols may be the set of previous symbols tracked by the remembrance factor. The modulation index tracking loop tracks the modulation index mismatch impairment, the time tracking loop tracks the time offset impairment, and the frequency tracking loop tracks the frequency drift impairment. The frequency tracking loop is initialized with an estimate of the frequency offset.

Based on the input signal and the previously demodulated symbols, the modulation index tracking loop outputs an instantaneous modulation index estimate, the time tracking loop outputs an instantaneous time offset estimate, and the frequency tracking loop outputs an instantaneous frequency offset estimate. These outputs are passed to respective variance estimators, which estimate the variance of these parameters over the symbols of the packet.

The outputs of the variance estimators are then weighted. Specifically, the output of the variance estimator associated with the modulation index tracking loop is weighted by a modulation index weighting, the output of the variance estimator associated with the time tracking loop is weighted by a timing weighting, and the output of the variance estimator associated with the frequency tracking loop is weighted by a frequency weighting. The weightings may be higher when the variation of the respective parameter is higher, as a higher variation indicates that the parameter (e.g., the modulation index) is not stable.

The weighted variance estimations are then summed. This sum represents the quantified impairments of the received signal. A LUT mapping is used to determine the instantaneous remembrance factor to be passed to the DFD (e.g., DFD 420) or the adaptive loop filtering block (e.g., adaptive loop filtering block 560). If the parameters (i.e., modulation index, time offset, frequency offset) vary over time (e.g., over some number of symbols or packets), the remembrance factor should be lower, whereas if the parameters are stable (or vary a very small amount) over time, then the remembrance factor can be higher. The variation may be compared to a threshold or a plurality of ranges to determine how far back the remembrance factor should account.

Although FIG. 6 illustrates tracking three parameters (i.e., modulation index, time offset, frequency offset), as will be appreciated, fewer parameters may be tracked, or additional parameters may be tracked, or a different set of parameters may be tracked. For example, for PSK modulation, there is no need to track modulation index mismatch, as a modulation index is not used for this type of modulation.

Figure 7:
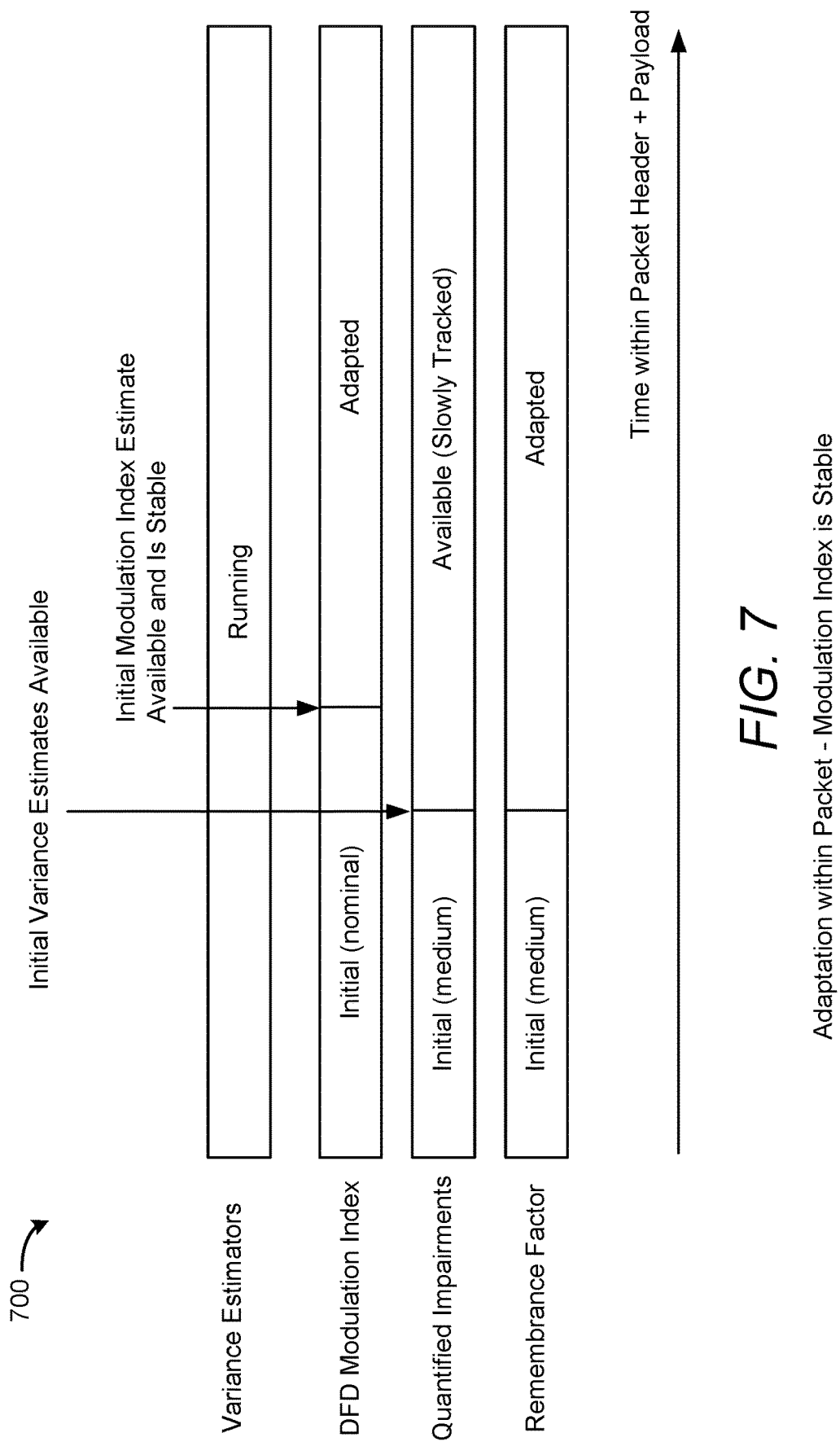
FIG. 7 illustrates a timeline of the disclosed remembrance factor adaption for a scenario in which the modulation index is stable, according to aspects of the disclosure.

FIG. 7 illustrates a timeline 700 of the disclosed remembrance factor adaption for a scenario in which the modulation index is stable, according to aspects of the disclosure. In the example of FIG. 7, time is represented horizontally, and represents the amount of time spent processing a packet during the remembrance factor adaption procedure illustrated in FIG. 6. As shown, the variance estimators (e.g., the three variance estimators shown in FIG. 6 for modulation index, time tracking, and frequency tracking) are running the entire time, the DFD modulation index is initialized with an initial (nominal) value, and the quantified impairments and remembrance factor are both initialized with an initial (medium) value. The "medium" value is the value in the middle of the two extremes allowed in the Bluetooth® specification for the transmitter. For example, for Bluetooth® Basic Rate GFSK transmission, the transmitted modulation index can be between 0.28 and 0.35, so the value of 0.315 can be chosen as the initial value.

At some point in time, the initial variance estimates are available, as indicated by the downward arrow. At this point, the estimate of the quantified impairments is available and slowly tracked (i.e., the output of FIG. 6 is continually updated as the packet is processed), and the remembrance factor is adapted based on the quantified impairments. At a slightly later point in time, based on the quantified impairments and adapted remembrance factor, the initial modulation index estimate is available and is stable.

Figure 8:
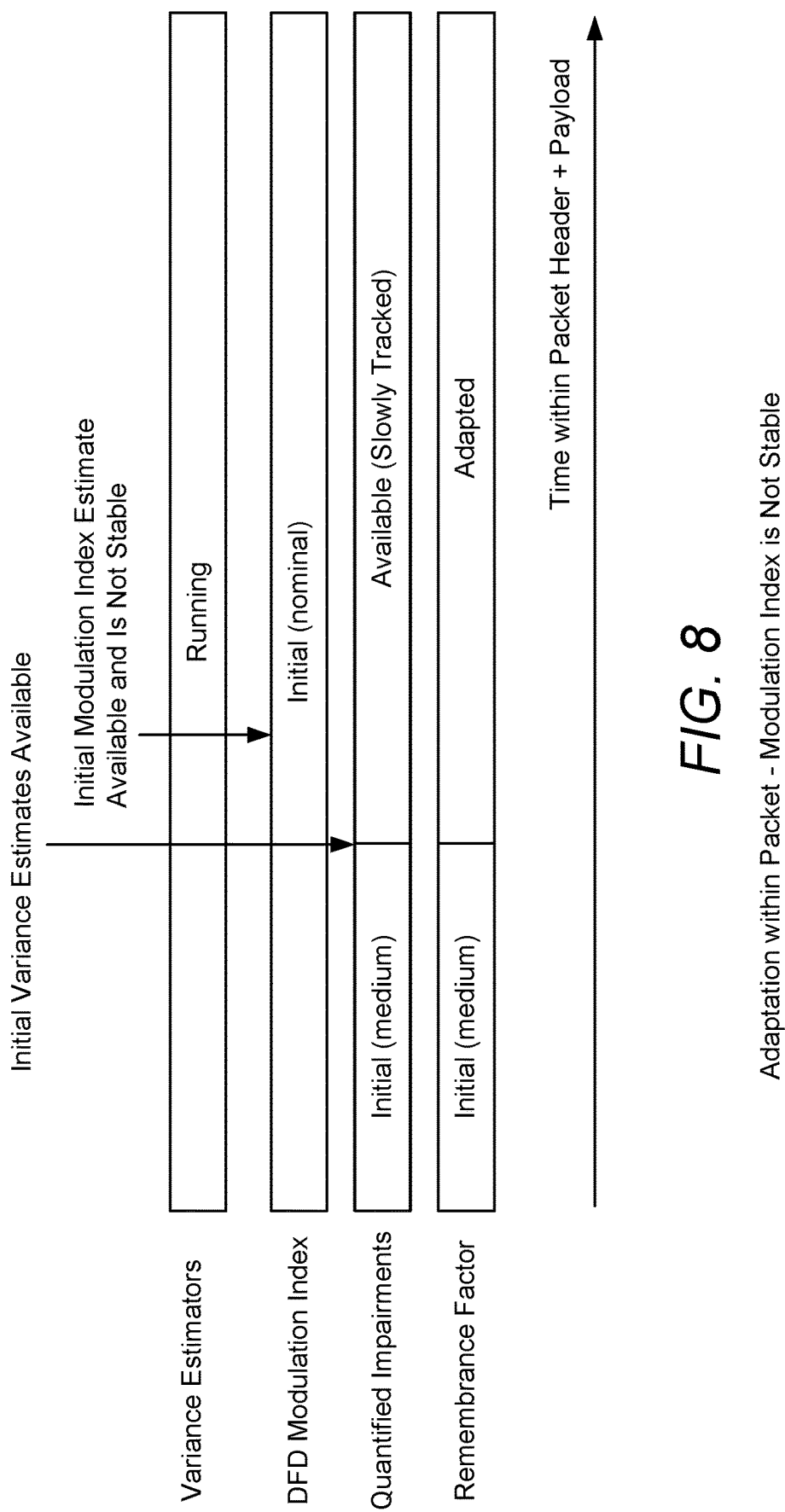
FIG. 8 illustrates a timeline of the disclosed remembrance factor adaption for a scenario in which the modulation index is not stable, according to aspects of the disclosure.

FIG. 8 illustrates a timeline 800 of the disclosed remembrance factor adaption for a scenario in which the modulation index is not stable, according to aspects of the disclosure. In the example of FIG. 8, time is represented horizontally, and represents the amount of time spent processing a packet during the remembrance factor adaption procedure illustrated in FIG. 6. As shown, the variance estimators (e.g., the three variance estimators shown in FIG. 6 for modulation index, time tracking, and frequency tracking) are running the entire time, the DFD modulation index is initialized with an initial (nominal) value, and the quantified impairments and remembrance factor are both initialized with an initial (medium) value. At some point in time, the initial variance estimates are available, as indicated by the downward arrow. At this point, the estimate of the quantified impairments is available and slowly tracked, and the remembrance factor is adapted based on the quantified impairments. At a slightly later point in time, based on the quantified impairments and adapted remembrance factor, the initial modulation index estimate is available. However, the initial demodulation index is not updated because the estimate is not stable.

There are a number of benefits of the adaptive remembrance factor techniques described herein. For a clean transmitter, there is a measurable performance improvement for various Bluetooth® modes, such as BR, EDR 2 Mbps, EDR 3 Mbps, LE 1 Mbps, and LE 2 Mbps when further increasing the remembrance factor. In addition, increasing the value of the remembrance factor from the default yields a significant improvement in sensitivity. For a dirty transmitter, there is also a measurable performance improvement for various Bluetooth® modes, such as BR, EDR 2 Mbps, EDR 3 Mbps, LE 1 Mbps, and LE 2 Mbps when further decreasing the remembrance factor. In addition, decreasing the remembrance factor below the default results in significantly increased gain.

Figure 9:
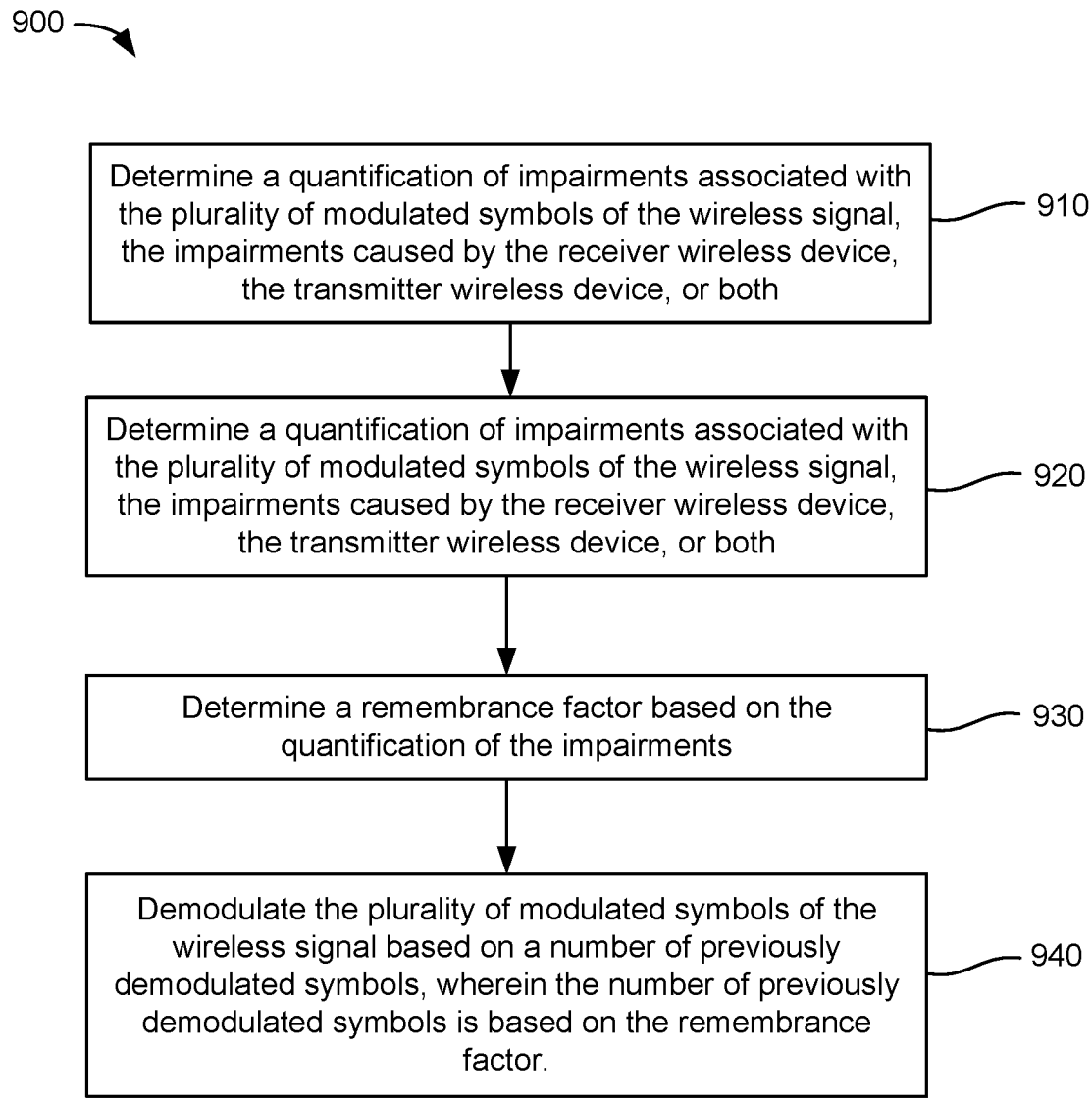
FIG. 9 illustrates an exemplary method of wireless communication, according to aspects of the disclosure.

FIG. 9 illustrates an exemplary method 900 of wireless communication, according to aspects of the disclosure. In an aspect, method 900 may be performed by a receiver wireless device, such as a receiver Bluetooth® device.

At 910, the receiver wireless device receives, from a transmitter wireless device (e.g., another Bluetooth®-capable device), a wireless signal comprising a plurality of modulated symbols forming at least one packet. In an aspect, operation 910 may be performed by the processor 202, the transceiver 220, the Bluetooth® processor 224, the memory 226, and/or the wireless interface 228, any or all of which may be considered means for performing this operation.

At 920, the receiver wireless device determines a quantification of impairments associated with the plurality of modulated symbols of the wireless signal, the impairments caused by the receiver wireless device, the transmitter wireless device, or both. In an aspect, operation 920 may be performed by the processor 202, the transceiver 220, the Bluetooth® processor 224, the memory 226, and/or the wireless interface 228, any or all of which may be considered means for performing this operation.

At 930, the receiver wireless device determines a remembrance factor based on the quantification of the impairments. In an aspect, operation 930 may be performed by the processor 202, the transceiver 220, the Bluetooth® processor 224, the memory 226, and/or the wireless interface 228, any or all of which may be considered means for performing this operation.

At 940, the receiver wireless device demodulates the plurality of modulated symbols of the wireless signal based on a number of previously demodulated symbols, wherein the number of previously demodulated symbols is based on the remembrance factor. In an aspect, operation 940 may be performed by the processor 202, the transceiver 220, the Bluetooth® processor 224, the memory 226, and/or the wireless interface 228, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a receiver wireless device, the method comprising:
   receiving, from a transmitter wireless device, a wireless signal comprising a plurality of modulated symbols forming at least one packet;
   determining a quantification of impairments associated with the plurality of modulated symbols of the wireless signal, the impairments caused by the receiver wireless device, the transmitter wireless device, or both;
   determining a remembrance factor based on the quantification of the impairments; and
   demodulating the plurality of modulated symbols of the wireless signal based on a number of previously demodulated symbols, wherein the number of previously demodulated symbols is based on the remembrance factor.

2. The method of claim 1, wherein the impairments comprise one or more parameters associated with transmission, reception, or both of the wireless signal.

3. The method of claim 2, wherein determining the quantification of impairments comprises:
   estimating an instantaneous value of each of the one or more parameters based on a tracking loop associated with each of the one or more parameters performed on the plurality of modulated symbols and the previously demodulated symbols;
   estimating a variance over time of each of the one or more parameters based on the instantaneous value of each of the one or more parameters;
   generating a weighted variance of each of the one or more parameters by applying a weighting to each of the one or more parameters based on an amount of the variance of each of the one or more parameters; and
   summing the weighted variance of each of the one or more parameters, wherein the quantification of impairments comprises the summed weighted variances.

4. The method of claim 3, wherein the one or more parameters comprise:
   a modulation index associated with the plurality of modulated symbols;
   a time offset associated with the plurality of modulated symbols;
   a frequency offset associated with the plurality of modulated symbols; or
   any combination thereof.

5. The method of claim 4, wherein the tracking loop associated with each of the one or more parameters comprises:
   a modulation index tracking loop;
   a time tracking loop; and
   a frequency tracking loop.

6. The method of claim 4, wherein the weighting applied to each of the one or more parameters comprises:
   a modulation index weighting;
   a timing weighting; and
   a frequency weighting.

7. The method of claim 4, wherein an initial value of the modulation index is used until an estimate of the modulation index based on the estimated variance of the modulation index is available and stable.

8. The method of claim 3, wherein initial values of the quantification of the impairments and the remembrance factor are used until the variance of each of the one or more parameters is estimated.

9. The method of claim 1, wherein determining the remembrance factor comprises:

determining the remembrance factor from a lookup table indexed by values of the quantification of impairments.

10. The method of claim 1, wherein:
the at least one packet comprises one packet, and
the remembrance factor is determined based on the plurality of modulated symbols of the one packet.

11. The method of claim 1, wherein:
the at least one packet comprises a plurality of packets, and
the remembrance factor is determined based on the plurality of modulated symbols over the plurality of packets.

12. The method of claim 1, wherein a decision feedback demodulator (DFD) of a receive modem of the receiver wireless device performs the demodulating.

13. The method of claim 1, wherein one or more tracking loops of a receive modem of the receiver wireless device determines the quantification of impairments.

14. The method of claim 1, wherein an adaptive loop filter of a receive modem of the receiver wireless device determines the remembrance factor.

15. The method of claim 1, wherein the plurality of modulated symbols are modulated based on a phase-shift keying (PSK) modulation or a gaussian frequency-shift keying (GFSK) modulation.

16. The method of claim 1, wherein the transmitter wireless device and the receiver wireless device comprise Bluetooth®-capable devices.

17. A receiver wireless device, comprising:
a memory;
a wireless interface; and
at least one processor communicatively coupled to the memory and the wireless interface, the at least one processor configured to:
receive, from a transmitter wireless device via the wireless interface, a wireless signal comprising a plurality of modulated symbols forming at least one packet;
determine a quantification of impairments associated with the plurality of modulated symbols of the wireless signal, the impairments caused by the receiver wireless device, the transmitter wireless device, or both;
determine a remembrance factor based on the quantification of the impairments; and
demodulate the plurality of modulated symbols of the wireless signal based on a number of previously demodulated symbols, wherein the number of previously demodulated symbols is based on the remembrance factor.

18. The receiver wireless device of claim 17, wherein the impairments comprise one or more parameters associated with transmission, reception, or both of the wireless signal.

19. The receiver wireless device of claim 18, wherein the at least one processor being configured to determine the quantification of impairments comprises the at least one processor being configured to:
estimate an instantaneous value of each of the one or more parameters based on a tracking loop associated with each of the one or more parameters performed on the plurality of modulated symbols and the previously demodulated symbols;
estimate a variance over time of each of the one or more parameters based on the instantaneous value of each of the one or more parameters;
generate a weighted variance of each of the one or more parameters by applying a weighting to each of the one or more parameters based on an amount of the variance of each of the one or more parameters; and
sum the weighted variance of each of the one or more parameters, wherein the quantification of impairments comprises the summed weighted variances.

20. The receiver wireless device of claim 19, wherein the one or more parameters comprise:
a modulation index associated with the plurality of modulated symbols;
a time offset associated with the plurality of modulated symbols;
a frequency offset associated with the plurality of modulated symbols; or
any combination thereof.

21. The receiver wireless device of claim 20, wherein the tracking loop associated with each of the one or more parameters comprises:
a modulation index tracking loop;
a time tracking loop; and
a frequency tracking loop.

22. The receiver wireless device of claim 20, wherein the weighting applied to each of the one or more parameters comprises:
a modulation index weighting;
a timing weighting; and
a frequency weighting.

23. The receiver wireless device of claim 20, wherein an initial value of the modulation index is used until an estimate of the modulation index based on the estimated variance of the modulation index is available and stable.

24. The receiver wireless device of claim 19, wherein initial values of the quantification of the impairments and the remembrance factor are used until the variance of each of the one or more parameters is estimated.

25. The receiver wireless device of claim 17, wherein the at least one processor being configured to determine the remembrance factor comprises the at least one processor being configured to:
determine the remembrance factor from a lookup table indexed by values of the quantification of impairments.

26. The receiver wireless device of claim 17, wherein:
the at least one packet comprises one packet, and
the remembrance factor is determined based on the plurality of modulated symbols of the one packet.

27. The receiver wireless device of claim 17, wherein:
the at least one packet comprises a plurality of packets, and
the remembrance factor is determined based on the plurality of modulated symbols over the plurality of packets.

28. The receiver wireless device of claim 17, wherein a decision feedback demodulator (DFD) of a receive modem of the receiver wireless device is configured to perform the demodulating.

29. The receiver wireless device of claim 17, wherein one or more tracking loops of a receive modem of the receiver wireless device determines the quantification of impairments.

30. The receiver wireless device of claim 17, wherein an adaptive loop filter of a receive modem of the receiver wireless device determines the remembrance factor.

31. The receiver wireless device of claim 17, wherein the plurality of modulated symbols are modulated based on a phase-shift keying (PSK) modulation or a gaussian frequency-shift keying (GFSK) modulation.

32. The receiver wireless device of claim 17, wherein the transmitter wireless device and the receiver wireless device comprise Bluetooth®-capable devices.

33. A receiver wireless device, comprising:
- means for receiving, from a transmitter wireless device, a wireless signal comprising a plurality of modulated symbols forming at least one packet;
- means for determining a quantification of impairments associated with the plurality of modulated symbols of the wireless signal, the impairments caused by the receiver wireless device, the transmitter wireless device, or both;
- means for determining a remembrance factor based on the quantification of the impairments; and
- means for demodulating the plurality of modulated symbols of the wireless signal based on a number of previously demodulated symbols, wherein the number of previously demodulated symbols is based on the remembrance factor.

34. A non-transitory computer-readable medium storing computer-executable instructions, the computer-executable instructions comprising:
- at least one instruction instructing a receiver wireless device to receive, from a transmitter wireless device, a wireless signal comprising a plurality of modulated symbols forming at least one packet;
- at least one instruction instructing the receiver wireless device to determine a quantification of impairments associated with the plurality of modulated symbols of the wireless signal, the impairments caused by the receiver wireless device, the transmitter wireless device, or both;
- at least one instruction instructing the receiver wireless device to determine a remembrance factor based on the quantification of the impairments; and
- at least one instruction instructing the receiver wireless device to demodulate the plurality of modulated symbols of the wireless signal based on a number of previously demodulated symbols, wherein the number of previously demodulated symbols is based on the remembrance factor.

* * * * *